(12) United States Patent
Klippert

(10) Patent No.: US 8,557,080 B2
(45) Date of Patent: Oct. 15, 2013

(54) METHOD FOR THE INSTALLATION OF AN ADJUSTING UNIT FOR A MOTOR VEHICLE AND ADJUSTING UNIT PRODUCED USING SAID METHOD

(75) Inventor: Uwe Klippert, Oberaula (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 833 days.

(21) Appl. No.: 12/598,758

(22) PCT Filed: Apr. 30, 2008

(86) PCT No.: PCT/EP2008/055339
§ 371 (c)(1),
(2), (4) Date: Nov. 25, 2009

(87) PCT Pub. No.: WO2008/135496
PCT Pub. Date: Nov. 13, 2008

(65) Prior Publication Data
US 2010/0126305 A1    May 27, 2010

(30) Foreign Application Priority Data
May 3, 2007    (DE) .......................... 10 2007 021 268

(51) Int. Cl.
*B29C 65/16*    (2006.01)
(52) U.S. Cl.
USPC ...................................................... 156/272.8
(58) Field of Classification Search
USPC ............ 156/272.2, 272.8; 219/121.6, 121.63, 219/121.64
See application file for complete search history.

(56) References Cited

U.S. PATENT DOCUMENTS

| 5,893,959 A | 4/1999 | Muellich |
| 2005/0082890 A1* | 4/2005 | Taubmann et al. ........ 297/344.1 |

(Continued)

FOREIGN PATENT DOCUMENTS

| DE | 102 50 994 A1 | 8/2003 |
| DE | 103 36 263 A1 | 3/2005 |

(Continued)

OTHER PUBLICATIONS

English translation of International Preliminary Report on Patentability dated Dec. 7, 2009 for corresponding PCT Application No. PCT/EP2008/055339, 14 sheets.

(Continued)

*Primary Examiner* — Daniel McNally
(74) *Attorney, Agent, or Firm* — Christie, Parker & Hale, LLP

(57) ABSTRACT

A method for assembling an adjusting unit for motor vehicles and the adjusting unit is disclosed. The adjusting unit includes at least two housing parts and further functional components arranged in or on the housing parts. One of the housing parts consists at least partially of a material that absorbs the laser irradiation, and the other housing part consists at least partially of a material that is permeable for the laser irradiation. The method includes connecting the housing parts by emitting laser irradiation, through a region of the housing permeable for the laser irradiation, which strikes another region of the housing absorbing the laser irradiation. The method further includes connecting at least one of the functional components by emitting laser irradiation, through a region of the housing permeable for the laser irradiation, which penetrates into the inside of the housing and connects with the housing at least one functional component arranged in the housing.

20 Claims, 5 Drawing Sheets

(56) References Cited

U.S. PATENT DOCUMENTS

| | | | |
|---|---|---|---|
| 2006/0213302 A1 | 9/2006 | Hoffmann et al. | |
| 2006/0219624 A1* | 10/2006 | Kuno | 210/435 |
| 2010/0136818 A1* | 6/2010 | Bermel et al. | 439/345 |

FOREIGN PATENT DOCUMENTS

| | | |
|---|---|---|
| DE | 103 37 475 A1 | 3/2005 |
| DE | 10 2005 026 205 B3 | 10/2006 |
| DE | 102005026205 B3 * | 10/2006 |
| EP | 0 751 865 B2 | 1/1997 |
| EP | 1 504 879 A2 | 2/2005 |
| WO | WO 2006/131499 A1 | 12/2006 |

OTHER PUBLICATIONS

International Search Report, dated Mar. 6, 2009, corresponding to PCT/EP2008/055339.

Renner, et al., "Lasergerechte Konstruktion beim Kunststoffschweissen," Kunststoffe, Carl Hanser Verlag, vol. 94, No. 2, Munich, Germany, Feb. 2004, pp. 30-34 plus 2 pages including English abstract, XP001046712.

DVS GMBH, "Quality control of $CO_2$ laser beam welding operations Seam preparation and constructive hints," Dec. 1988, 7 pages total including English abstract, XP009105107.

* cited by examiner

METHOD FOR THE INSTALLATION OF AN ADJUSTING UNIT FOR A MOTOR VEHICLE AND ADJUSTING UNIT PRODUCED USING SAID METHOD

CROSS-REFERENCE TO A RELATED APPLICATION

This application is a National Phase Patent Application of International Patent Application Number PCT/EP 2008/055339, filed on Apr. 30, 2008, which claims priority of German Patent Application Number 10 2007 021 268.4, filed on May 3, 2007.

BACKGROUND

The invention relates to a method for the production of an adjusting unit for a motor vehicle according to claim 1 and an adjusting unit producible thereby according to claim 21.

Such adjusting unit can in particular be an adjusting unit which serves for adjusting the position of a motor vehicle part, such as for example the adjusting of an adjustable window pane of a motor vehicle door, the adjustment of a roller blind serving as a sunshade, the adjustment of a seat part of a motor vehicle or the adjustment of a lock part of a locking system of the motor vehicle. Specifically, the adjusting unit is for example formed by a drive unit which comprises a drive housing consisting of said housing parts and drive components which are fixed or mounted in or on the drive housing, such as for example gearing parts, bearing elements for the gearing parts, sensor elements, a control device (insertion electronics), electrical plugs, plug adaptors, brush holders of a commutator motor and so on.

Specifically, the assembly of an adjusting unit is concerned, the adjusting unit comprising at least a first and a second housing part which, for forming the housing of the adjusting unit, are to be connected to each other, the adjusting unit furthermore comprising functional components to be arranged in or on the housing which are to be fixed on one of the two housing parts.

For producing the connections required hereto between the housing parts as well as between the housing formed thereby and the further functional components, various joining techniques are used, generally in combination, as for example welding, inductive fusing, snap-fitting, riveting and screwing. Herein, as welding technique, in particular the so called laser welding can also be used, compare EP 0 751 865 B2.

SUMMARY

It is an object of the invention to provide a method of the kind stated in the beginning which is characterized by a simple and time efficient operability.

This object is achieved by providing a method with the features of claim 1.

According to this, for the assembly of the adjusting unit the following method steps are carried out:

providing at least one irradiation source by which a laser irradiation usable for laser welding is producible;
providing at least one housing part of the adjusting unit which at least partially consists of a material that is non-permeable (non-transparent) for the laser irradiation of the irradiation source;
providing at least a further housing part of the adjusting unit which at least partially consists of a material that is permeable (transparent) for the laser irradiation of the irradiation source;
arranging further functional components of the adjusting unit on at least one of the housing parts such that these are arranged in or on the housing formed by the housing parts;
connecting the housing parts in that the housing and the irradiation source are positioned with respect to each other such that laser irradiation radiated therefrom strikes, through a region of the housing that is permeable for the irradiation, a region of the housing that is non-permeable for the irradiation (that means absorbing the irradiation) and thereby connects two regions of the housing parts abutting each other with each other, and
positioning the housing and the irradiation source with respect to each other such that laser irradiation emitted from the irradiation source penetrates, through a region permeable for the laser irradiation, into the inside of the housing and connects, at this location, at least one functional component of the adjusting unit being arranged in the housing with the housing.

The solution according to the invention has the advantage that, with one laser arrangement, both the housing parts forming the housing of the adjusting unit and further functional components of the adjusting unit being arranged in or on the housing can be fixed in their respective intended location. In particular, by using the laser welding for a multiplicity of joining operations, which not only concern the connection of housing parts, but in addition also the fixing of further functional components on the housing, other fixing means such as for example screws or snap means can at least partially be dispensed.

Herein, the used irradiation source can on the one hand comprise only a single element irradiating laser irradiation such that during the assembly always only one laser beam acts on the adjusting unit and the adjusting unit on the one hand and the irradiation source on the other hand must, during the assembly, successively be positioned such that the one laser beam consecutively produces the required connections between the component parts of the adjusting unit. On the other hand, the used irradiation source can also comprise multiple elements emitting laser irradiation such that, during the assembly of the adjusting unit, at the same time on multiple locations laser irradiation (being emitted from different, spaced apart spatial locations) in each case strikes the adjusting unit to connect local component parts with each other in the intended way.

The regions of the housing parts to be connected to each other by the laser welding and the regions of the further functional components of the adjusting unit to be fixed on the housing by the laser welding consist, in particular, of plastics; however, the laser welding may also be applied to metal parts, compare Bulletin DVS 3203, part 4 of Deutscher Verband für Schweißtechnik e.V. (1988).

For connecting the two housing parts using laser welding, the two housing parts regionally abut each other, possibly via a plug region by which one of the housing parts engages in an associated reception region of the other of the two housing parts.

The two housing parts are then irradiated with the laser irradiation used for producing the component connection such that it first radiates through a region of one of the two housing parts that is permeable for the laser irradiation and then strikes a region, abutting hereto, of the other of the two housing parts which is non-permeable (that means absorbing the laser irradiation), wherein the two housing parts are welded to each other by melting the region of the other housing part absorbing the laser irradiation.

In an according manner the laser irradiation, for fixing further functional components on or in the housing, is guided such that it first irradiates through a region of the housing permeable for the laser irradiation and then strikes a region of the respective functional component to be fixed hereon, the region of the functional component abutting on that housing region such that, hereby, again a welding connection is formed.

The further functional components to be fixed on the housing of the adjusting unit may be for example bearing elements for gearing parts, sensor elements, a control device (control electronics), drive elements or electrically conducting elements such as plugs, plug adaptors, connecting cables or brushes of a commutator motor. With these elements, typically a receptacle or a protective cover (for example in case of electrical lines) made of plastics or metal is associated, via which then the fixing on the housing of the adjusting unit by laser welding takes place. The mentioned plug adaptors therein may be fixed by laser welding not only on the housing, but may in addition also be sealed.

Furthermore, component parts can be fixed by the laser welding in or on the housing also in order to prevent rattling sounds.

Furthermore, in or on the housing an elastic element (spring element) may be arranged which acts onto at least one of the functional components fixed on the housing with pretension such that this functional component is pretensioned towards its intended position on or in the housing. By using such an elastic element for positioning functional components arranged in the housing prior to the laser welding, additional adjustment procedures can be dispensed. Instead of fixing the respective functional components on the housing by laser welding or in addition hereto, also a fixation of the elastic element may be achieved using laser welding.

Furthermore, one and the same welding seam, which is formed during the laser welding by means of the used laser irradiation, can be used both for connecting the housing parts and for fixing at least a further functional component on the housing. For this, the laser irradiation used for forming the welding seam on the one hand is guided such that it strikes regions that abut each other of the housing parts to be joined and on the other hand is guided in a region immediately adjacent thereto such that it strikes regions that abut each other of the housing and a further functional component to be fixed hereon.

An adjusting unit, which according to the invention can be assembled by laser welding, for a motor vehicle is characterized by the features of claim 21.

Advantageous embodiments of such adjusting unit result from the claims dependent herefrom.

BRIEF DESCRIPTION OF THE DRAWINGS

Further details and advantages of the invention will become clear from the subsequent description of exemplary embodiments according to the figures.

Herein

DETAILED DESCRIPTION

Figure 1:
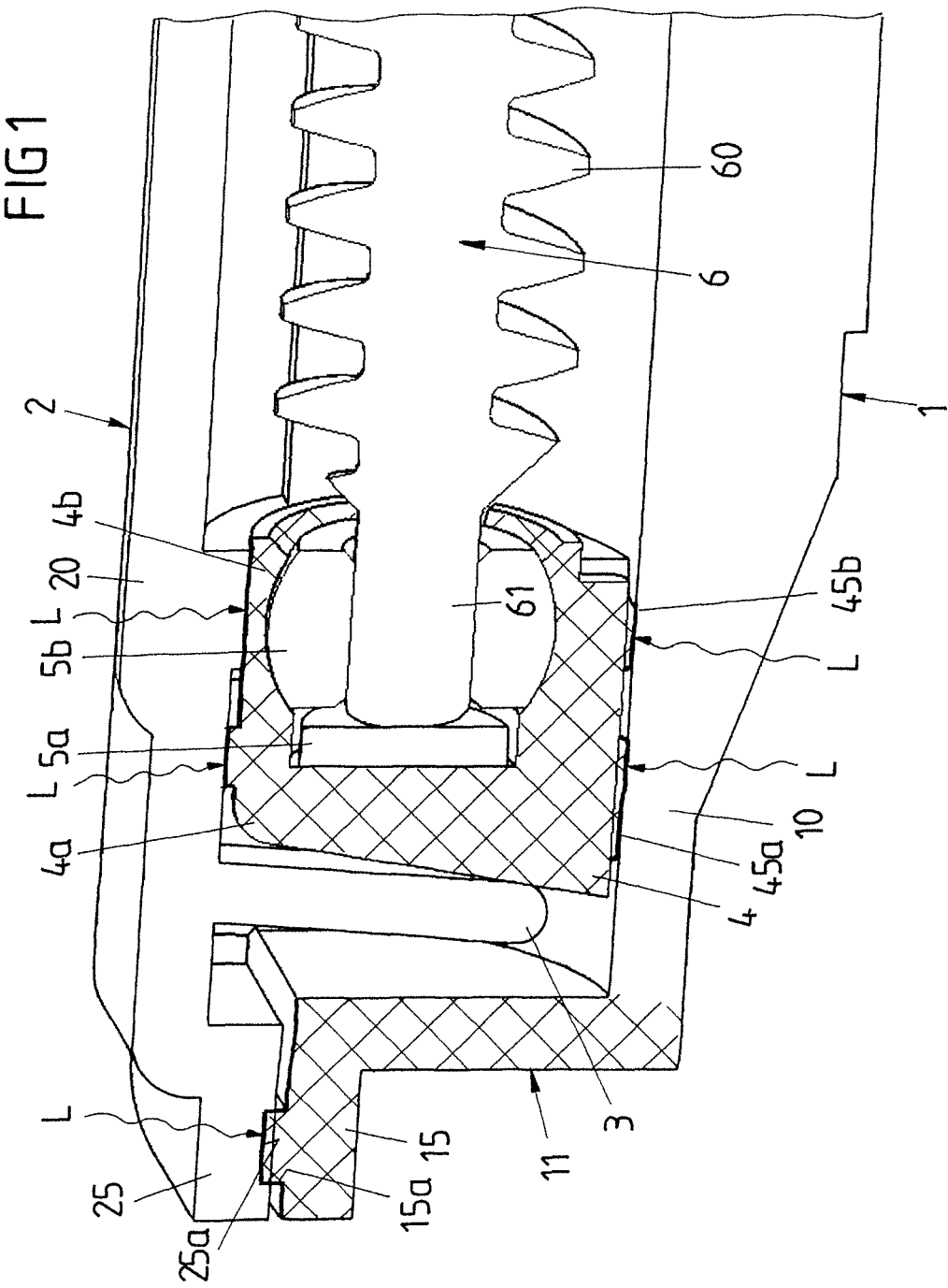
FIG. 1 shows a first embodiment of an adjusting unit of a motor vehicle with a housing which comprises two housing parts connected to each other by laser welding and with further functional components arranged in the housing which are at least partially fixed on the housing by laser welding.

FIG. 1 shows a cut-out of an adjusting unit for a motor vehicle in the shape of a housing 1, 2, in whose inside an adjusting gearing is mounted. This is driven in a known way for example by means of an associated drive motor and serves for example for adjusting the position of a seat part of a motor vehicle or of another adjusting part.

The housing comprises, in this case, two housing parts 1, 2, which consist of plastics and each are formed in the shape of a half shell such that they confine, with their base bodies 10, 20, an inner space of the housing 1, 2. The two housing parts are connected to each other on their edge by means of fixing regions in the shape of fixing flanges 15, 25 abutting each other in such a manner that they enclose an inner space of the housing in which a gearing element 6 with an outer toothing 60, for example in the shape of a worm or a spindle, is mounted. This latter purpose is served by a bearing receptacle 4 arranged in the housing 1, 2, comprising a first reception area 4a in which a bearing plate 5a made of metal is arranged as an axial bearing for the gearing element 6 and a second reception area 4b in which a radial bearing 5b in the shape of a calotte bearing is arranged. This is engaged by a bearing shaft 61 associated with the gearing element 6 and in particular being integrally formed hereon, the bearing shaft 61 being supported axially on the bearing plate 5a.

Furthermore, on the housing 1, 2 an elastic element 3 is provided, in particular being integrally formed, which extends into the inside of the housing and acts under pretension onto the bearing receptacle 4 such that the bearing receptacle 4 is pretensioned in the direction of its intended position within the inside of the housing 1, 2.

For connecting the two housing parts 1, 2 by laser welding using a laser irradiation L generated by a laser arrangement, the instant two housing parts 1, 2 consist predominantly of material permeable for the laser irradiation. Only a region 11 of the one housing part 1, which in particular also comprises its fixing flange 15, consists of a material non-permeable for the laser irradiation L. For this, the plastics, out of which the one housing part 1 consists, can in that region 11 be provided for example with suitable additives.

Pure plastics which is not charged with additives absorbs electromagnetic irradiation generally only in the ultraviolet range and in the infrared range and comprises, between these two bands, only a neglectably small absorption of light. However, when choosing a plastics which is permeable (transparent) for the used laser irradiation L attention must be paid that it does not scatter the light too excessively; otherwise, despite the principle permeability of the plastics in the range of the visual light, no sufficient transparency exists due to the scattering effects. These problems are known and well examined such that a person skilled in the art can choose by implication suitable plastics which are sufficiently transparent for the used laser irradiation, compare Thomas Renner/Michael Sieffert in *Kunststoffe* 2/2004, pages 30 to 36 (Munich, 2004).

Lasers which are suitable for the laser welding, inter alia because the wave length of the laser irradiation lies in a range in which many plastic materials are permeable (transparent), may be diode lasers as well as Nd:YAG lasers.

As additives by which, in a housing part 1 consisting of plastics, selectively a region 11 can be provided that is non-transparent for the used laser irradiation L, for example soot, colour pigments, colorant or specifically developed laser pigments are suitable. Such additives are also called laser absorbers.

The fixing flange 15 of the one housing part 1, which is non-permeable, i.e. absorbing, for the laser irradiation L, comprises a protrusion 15a forming a plug region which engages in an associated reception area 25a of the fixing flange 25, being transparent for the laser irradiation L, of the other housing part 2.

For connecting the two housing parts 1, 2 in the region of their fixing flanges 15, 25, the housing is irradiated with laser irradiation L such that it first radiates through the fixing flange 25 being transparent for the laser irradiation and subsequently strikes the plug region 15a, engaging in the reception region 25a, of the fixing flange 15 being non-transparent for the laser irradiation L and melts it. Hereby, the two housing parts 1, 2 are welded to each other on their fixing flanges 15, 25, more precisely in that location where the plug region 15a of a fixing flange 15 engages in the reception region 25a of the associated other fixing flange 25.

During the exposure of the laser irradiation L for welding the two housing parts 1, 2, regularly not only the region 11 being non-transparent, that means absorbing, for the laser irradiation L of the one housing part 1 or the fixing flange 15 provided at that location is melted. Although the immediate exposure of the laser irradiation L itself causes at first only a melting of the fixing flange 15 absorbing the laser irradiation L, the warming of this fixing flange 15 however subsequently generally also leads to a melting of the immediately neighbouring, abutting transparent fixing flange (through heat conduction) such that the resulting melting zone extends over both fixing flanges 15, 25 and the solidifying (possibly using an externally applied pressure) resulting melting zone leads to the wanted welding connection of the two housing parts 1, 2 on the fixing flanges 15, 25.

During the assembly of the adjusting unit shown in FIG. 1 not only the two housing parts 1, 2 are connected to each other by laser welding, but the laser irradiation L furthermore is also used to fix the bearing receptacle 4—in its intended position adopted under the action of the elastic element 3—in the housing 1, 2.

For this, on the one hand laser irradiation L can be used which originates from the same element (irradiation source) emitting laser irradiation, by means of which also the two housing parts 1, 2 have been connected to each other. Alternatively, multiple elements emitting laser irradiation can also be used to perform multiple welding processes in parallel (at the same time).

Herein, the housing 1, 2 is made in those regions on which the bearing receptacle 4 is to be fixed in each case from a material transparent for the laser irradiation L, such that the laser irradiation L at first penetrates those regions of the housing 1, 2 and subsequently strikes fixing regions 45a, 45b of the bearing receptacle 4 abutting hereon, which consist of a material non-transparent (that means absorbing) for the laser irradiation L such that these fixing regions 45a, 45b are melted under the exposure of the laser irradiation L and hereby a welding connection between the fixing regions 45a, 45b and the adjacent regions of the housing 1, 2 is formed.

Figure 2:
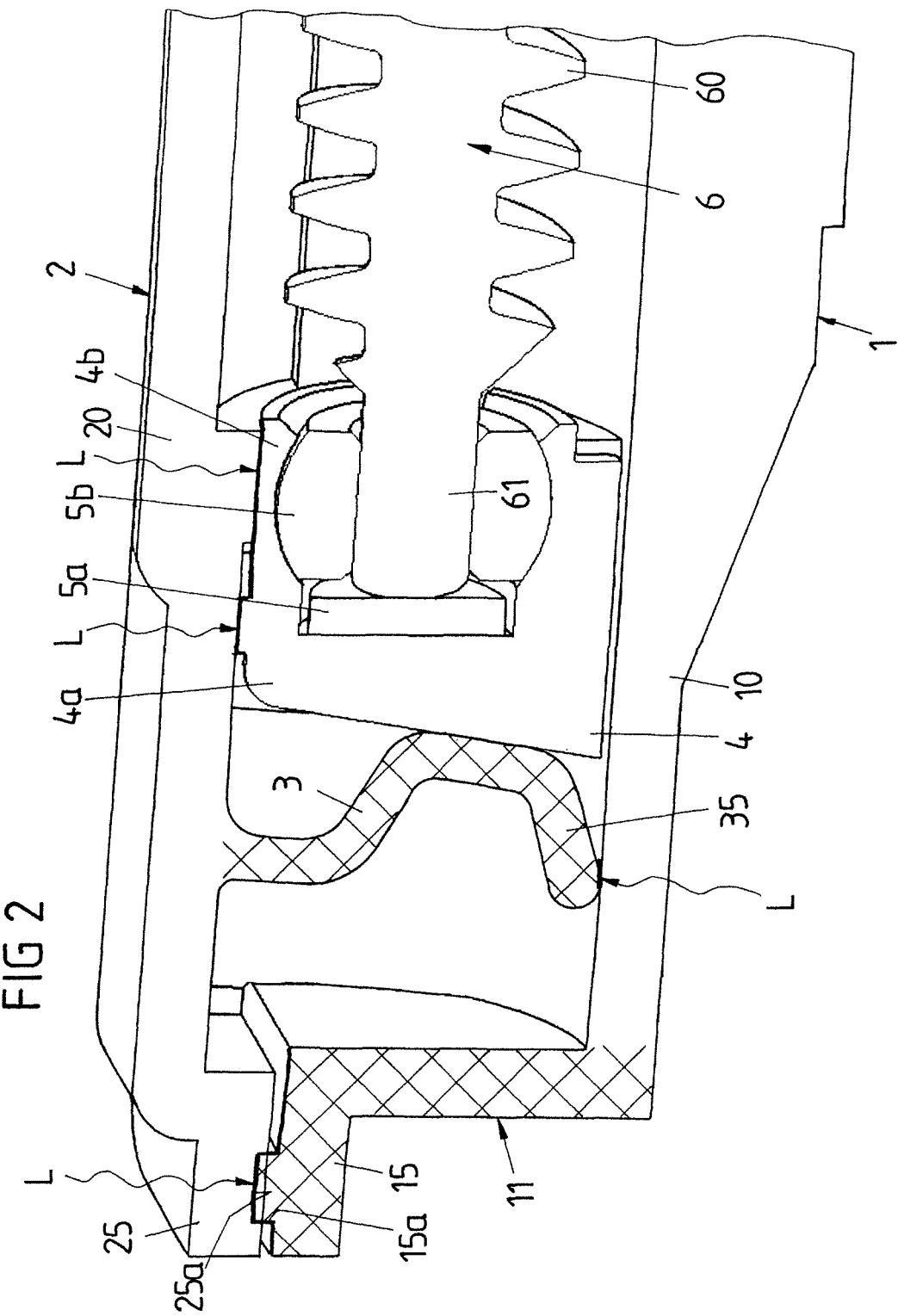
FIG. 2 shows a first modification of the embodiment of FIG. 1.

FIG. 2 shows a modification of the embodiment of FIG. 1, according to which not the bearing receptacle 4, but rather the elastic element 3 holding the bearing receptacle in its intended position is fixed on the housing 1, 2 by laser welding. For this, a fixing section 35, consisting of a material that is non-transparent for the used laser irradiation L, but meltable by the used laser irradiation L, of the elastic element 3 abuts on a region transparent for the laser irradiation of the housing 1, 2 and is fixed in this location by the irradiation of laser light L. This variant allows for using non-weldable materials for the bearing receptacle 4.

Figure 3:
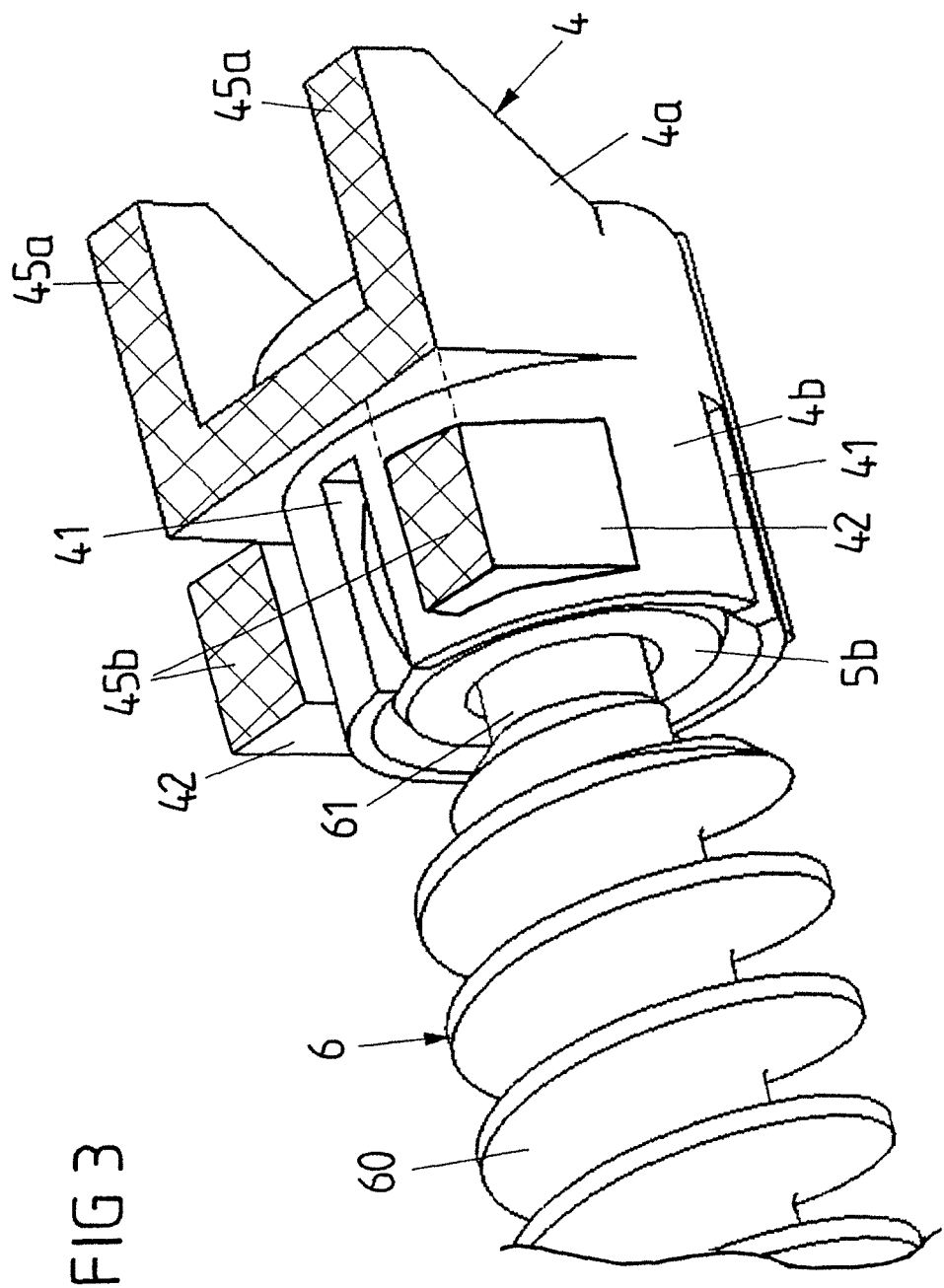
FIG. 3 shows a part of the adjusting unit from FIG. 1 according to a further embodiment.

FIG. 3 shows a cut-out of the arrangements of FIGS. 1 and 2 in a perspective view, namely in a variant according to which the bearing receptacle 4 in its bearing region 4b serving for mounting the radial bearing 5b comprises at least 1 longitudinal slit extending in the axial direction (in reference to the gearing element 6). This provides a certain elasticity of that bearing region 4b and thereby simplifies the axial insertion of the radial bearing 5b.

To ensure that that second bearing region 4b, past completion of the adjusting unit, is sufficiently stable and can be subjected also to larger bearing forces, bearing mounts 42 protrude from the second bearing region 4b, which each comprise a fixing region 45b made of a material that is non-transparent for the laser irradiation used for the laser welding and thereby is meltable. Thereby, a fixing of the second bearing region 4b is achieved via the fixing regions 45b of the fixing mounts 42 on the associated housing and thereby also a stiffening of the overall arrangement.

The fixing of the first bearing region 4a of the bearing receptacle 4, in which an axial bearing is contained, again is carried out via fixing regions 45a protruding therefrom and abutting on the inner surface of the associated housing.

Figure 4A:
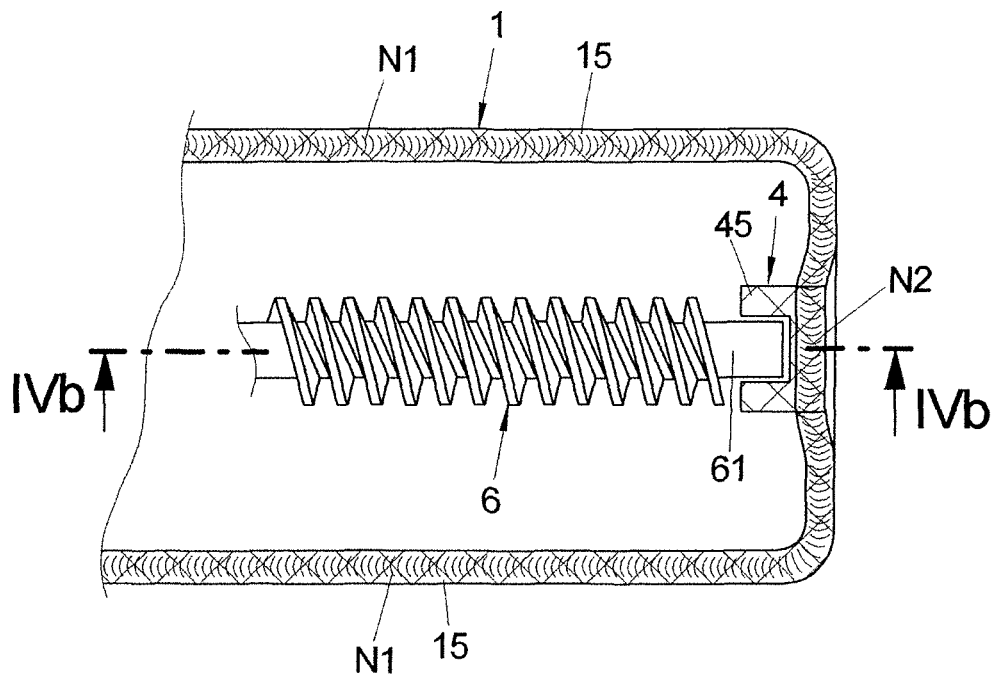
FIGS. 4a and 4b show a section each through a schematically shown adjusting unit for a motor vehicle in which, by means of laser welding, both two housing parts are connected to each other and at least one further functional component is fixed on the housing.
Figure 4B:
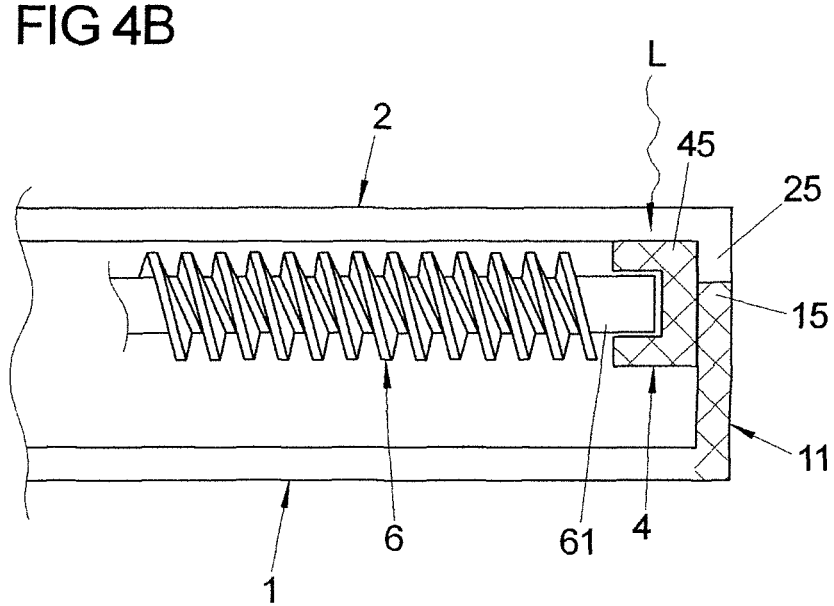

In FIGS. 4a and 4b, in a schematic top view onto the adjusting unit without the one, top housing part (FIG. 4a) and in a schematic longitudinal section (FIG. 4b), a refinement of the arrangements of FIGS. 1 to 3 is shown, according to which a continuous welding seam N1, N2 serves both for connecting the two housing parts 1, 2 of the housing and for fixing a further functional component in the shape of the bearing receptacle 4 on the housing 1, 2.

For this, the welding seam N1, N2 extends on the one hand regionally as welding seam section N1 along the fixing flanges 15, 25, via which the two housing parts 1, 2 are connected to each other, and extends on the other hand in a welding seam section N2, immediately adjacent hereto and generated in the same welding process, outside of those fixing flanges 15, 25 along a fixing region along which a fixing region 45 of the bearing receptacle 4 abuts on a region of the housing 1, 2 transparent for the used laser irradiation L.

Figure 5:
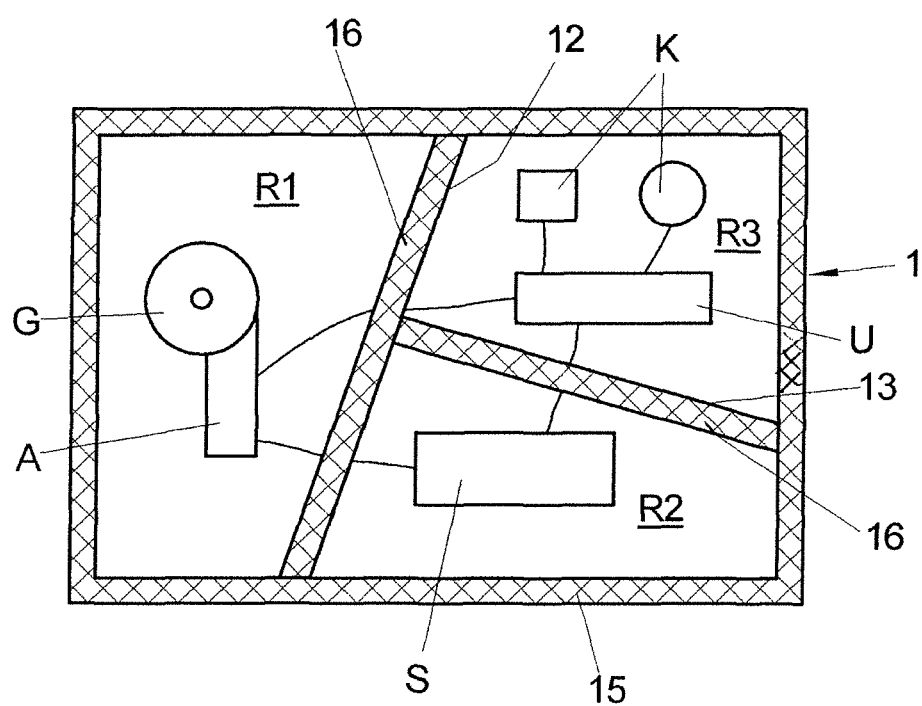
FIG. 5 shows an embodiment of an adjusting unit for a motor vehicle whose housing defines multiple separate regions apart from each other.

FIG. 5 shows a housing part 1 of a housing in a top view which comprises a circumferential fixing flange 15 consisting of a material that is non-transparent for laser irradiation, that means absorbing, for connection with a further housing part, as described above. The housing part 1 forms a receptacle for various functional components A, G, K, S, U, which are denoted in FIG. 5 only schematically. Some of these functional components A, G, K, S, U can therein be fixed, analogously to the functional components 3, 4 explained above according to FIGS. 1 to 4b, at the same time within the housing as the housing part 1 shown in FIG. 5 is connected with a further housing part by laser welding.

A specialty of the housing part shown in FIG. 1 lies in that its inner space containing the functional components A, G, K, S, U is divided into multiple chambers R1, R2, R3 by two connecting regions 12, 13 provided within the housing part 1 in the shape of connecting bridges, the chambers R1, R2, R3 each containing a portion of the functional components A, G; K, U; S. These connecting regions 12, 13, in addition, stabilize the housing part 1 mechanically, because they provide additional connections between the different wall regions of the housing part 1 and connect these, in addition, with the floor of the housing part 1.

On the connecting regions 12, 13 in the shape of connecting bridges, in the instant embodiment, a fixing flange 16 each is formed from a material that is non-transparent, that means absorbing, for the laser irradiation used for the laser welding. Hereby, the connecting regions 12, 13, when connecting the housing part 1 shown in FIG. 5 with a further housing part through laser welding, at the same time can also be connected with an associated housing region of the other housing part such that the division of the housing inside into multiple chambers extends to both housing parts to be connected.

According to FIG. 5, in a chamber R1 of the housing part 1, by way of example, a gearing G formed by gearing parts and an associated drive motor A for actuating the gearing G is arranged. In an adjacent chamber R2 of the housing part 1 a control electronics S, which serves for controlling the drive motor A, and in a further, third chamber R3 a monitoring electronics U, which for example monitors the drive motor A and further functional components K and transfers, in dependence therefrom, signals to the control electronics S, can be provided.

All three chambers R1, R2, R3 are separated from each other, herein, through the bridge-like connecting regions 12, 13 described above. In this way, the gearing parts of the gearing G arranged in the one chamber R1 can be lubricated without impairing hereby the functional components K, S, U provided in the other two chambers R2, R3 which possibly shall not come into contact with lubrication. If the used drive motor A likewise is sensible to lubrication it in turn can be mounted in a chamber separate from the gearing G.

Possible openings in the connecting regions 12, 13, for example for electrical or optical lines visible in FIG. 5, to be able to couple the various functional components A, G, K, S, U to each other, are to be sealed in a suitable manner as needed, for example such that no lubrication means attain from the first chamber R1 into the second or third chamber R2, R3.

Through the connecting regions 12, 13 provided in the one housing part 1 in the shape of connecting bridges, which during welding of that housing part 1 with a further housing part preferably are also welded with associated housing regions of the other housing part, thus both a mechanical stabilisation and stiffening of the housing and a division of the housing in sub-chambers, which are suitable for containing various functional components, is achieved.

The invention claimed is:

1. A method for assembling an adjusting unit for motor vehicles, wherein the adjusting unit comprises a housing having at least two housing parts and further functional components arranged in or on the housing and to be built into a motor vehicle, the method comprising:
   providing at least one irradiation source by which a laser irradiation usable for laser welding is producible;
   providing one of the at least two housing parts of the adjusting unit, wherein one of the housing parts at least partially comprises a material that absorbs the laser irradiation;
   providing the other housing part of the at least two housing parts, wherein the other housing part at least partially comprises a material that is permeable for the laser irradiation;
   arranging the further functional components of the adjusting unit on at least one of the housing parts such that the further functional components are arranged in or on the housing formed by the housing parts;
   connecting the housing parts to each other by assembling the housing parts and positioning the assembled housing parts and the at least one irradiation source with respect to each other in such a manner that emitted laser irradiation, through a region of the housing permeable for the laser irradiation, strikes another region of the housing absorbing the laser irradiation and thereby connects to each other the two regions abutting each other;
   positioning the housing and the at least one irradiation source with respect to each other in such a manner that the emitted laser irradiation, through a region of the housing permeable for the laser irradiation, penetrates into the inside of the housing and connects with the housing at least one of the further functional components arranged in the housing; and
   further connecting the housing parts to each other and fixing at least one of the further functional components on the housing via a single, continuous welding seam.

2. The method according to claim 1, wherein the laser irradiation used for the laser welding penetrates a region permeable for the laser irradiation of the housing before the laser irradiation melts a material region serving as a fixing region for producing a welding connection.

3. The method according to claim 2, wherein the fixing region forms an integral part of one of the housing parts.

4. The method according to claim 3, wherein the fixing region abuts the housing region which is radiated through by the laser irradiation and is permeable for the laser irradiation.

5. The method according to claim 4, wherein the fixing region and the housing region which is radiated through by the laser irradiation and is permeable for the laser irradiation engage each other.

6. The method according to claim 2, wherein the fixing region forms an integral part of at least one of the further functional components.

7. The method according to claim 6, wherein the fixing region of the at least one further functional component abuts the housing region which is radiated through by the laser irradiation and is permeable for the laser irradiation.

8. The method according to claim 2, wherein the melted fixing region abuts the housing region penetrated previously by the laser irradiation such that the melted fixing region assumes a welding connection with the housing region penetrated by the laser irradiation.

9. The method according to claim 1, wherein during the laser welding with the laser irradiation, elements for stiffening the adjusting unit by laser welding are connected to the housing.

10. The method according to claim 9, wherein a fixing mount protruding from a bearing device is used as a stiffening element.

11. The method according to claim 9, wherein at least one bridge extending within the housing or a wall section is used as a stiffening element.

12. The method according to claim 1, wherein the further functional components serve for mounting, controlling or regulating a drive device.

13. The method according to claim 12, wherein the further functional components comprise at least one of:
   a bearing device for a drive means of the adjusting unit;
   a control device;
   a sensor;
   at least one of an electrical plug and a plug adaptor;
   brush holders for a commutator motor; and
   an elastic device for pretensioning an associated functional component.

14. The method according to claim 1, wherein at least one gearing element is mounted in the housing.

15. The method according to claim 14, wherein the at least one gearing element is shaped as a worm or a spindle.

16. The method according to claim 1, wherein for forming the housing, housing parts are used which at least partially comprise plastics.

17. The method according to claim 16, wherein for forming the housing parts, a plastics that is permeable for the laser irradiation is used and wherein regions of the housing parts absorbing the laser irradiation are produced by adding additives to the plastics.

18. The method according to claim 1, wherein an elastic element is associated with at least one of the further functional components, the elastic element pretensioning a respective one of the further functional components towards its intended position.

19. The method according to claim 1, wherein during the laser welding with the laser irradiation, one seam section is formed for connecting the housing parts to each other, and wherein during the laser welding with the laser irradiation, a seam section immediately adjoining the one seam section is formed for fixing at least one of the further functional components on the housing.

20. The method according to claim 1, wherein at least one wall section which is connected to the housing by laser welding with the laser irradiation extends within the housing.

* * * * *